UNITED STATES PATENT OFFICE.

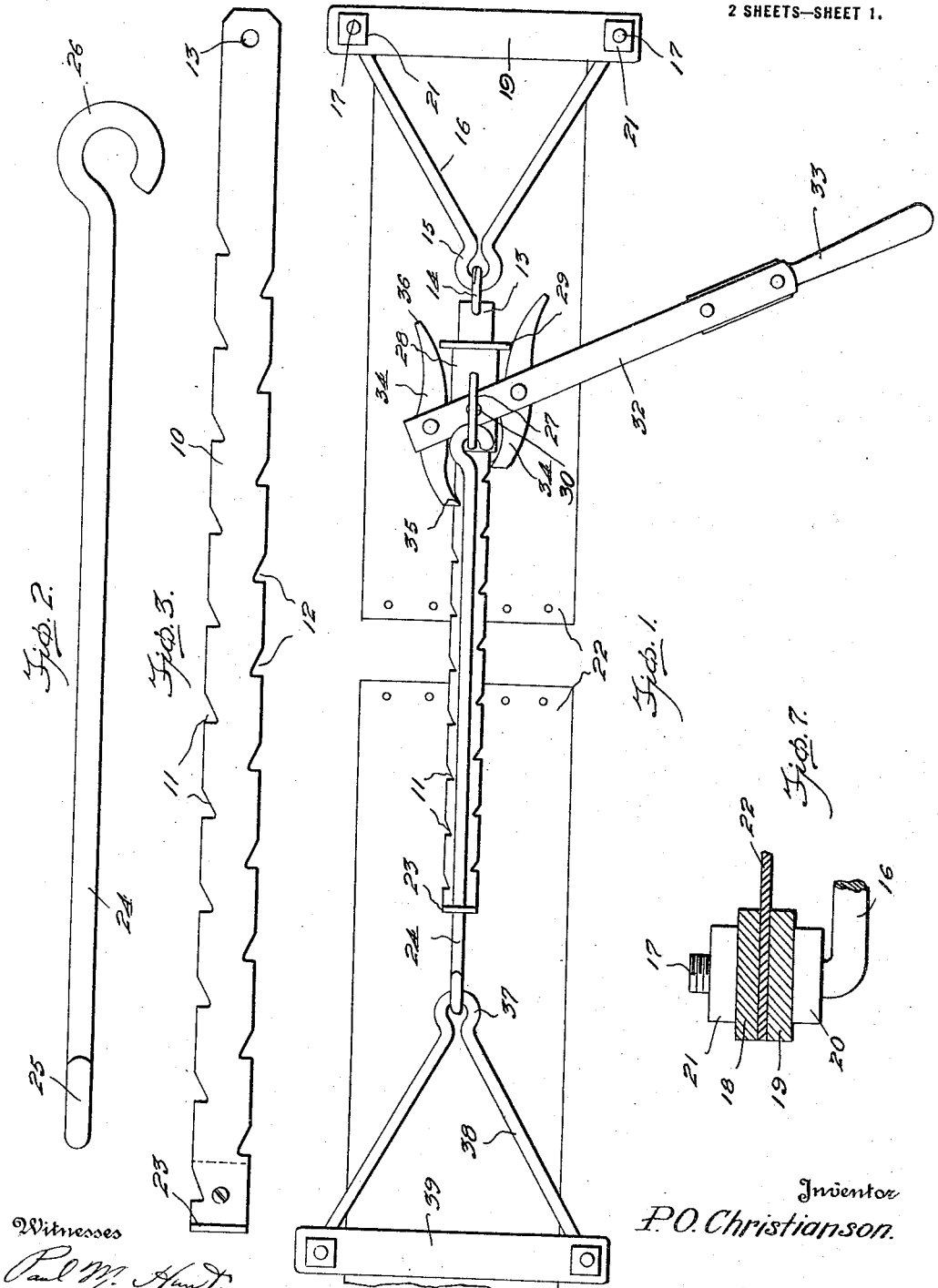

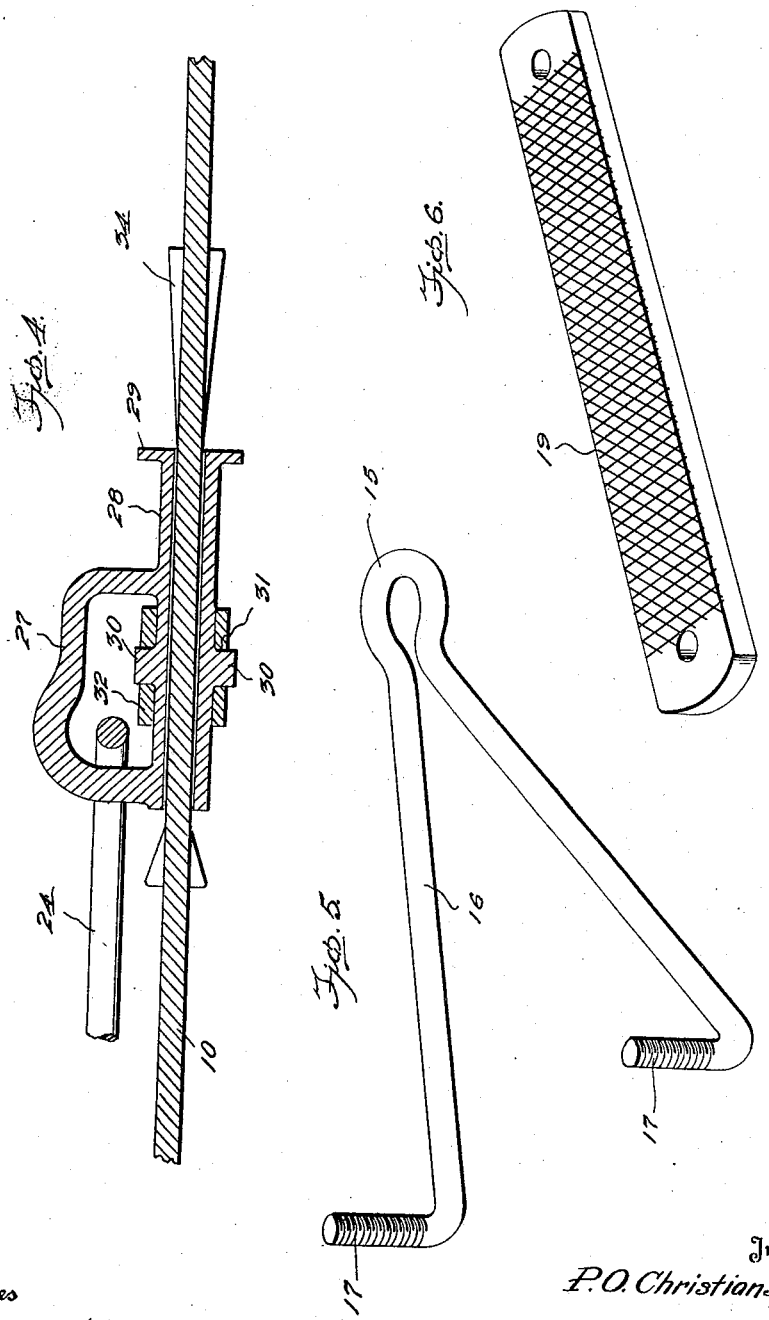

PETER O. CHRISTIANSON, OF STORY CITY, IOWA.

BELT STRETCHING AND LACING DEVICE.

1,217,276.          Specification of Letters Patent.    Patented Feb. 27, 1917.

Application filed February 11, 1916. Serial No. 77,592.

*To all whom it may concern:*

Be it known that I, PETER O. CHRISTIANSON, a citizen of the United States, residing at Story City, in the county of Story and State of Iowa, have invented certain new and useful Improvements in Belt Stretching and Lacing Devices, of which the following is a specification.

This invention relates to improvements in belt stretching and lacing devices, one object of the invention being the provision of a device, which is adapted to be connected to the free ends of a power transmission belt, and be so operated as to bring such ends into position for receiving the lacing.

A further object of the present invention is the provision of two belt gripping clamps and manually operated means for drawing the clamps nearer to one another so that the ends of the belt to be laced may be brought and held together during lacing, and at the same time the belt is properly stretched.

A still further object of this invention is the provision of a device of this character, which is simple, durable and inexpensive in construction and which is thoroughly efficient and practical in use.

In the accompanying drawings:—

Figure 1 is a plan view showing the present device in the position it assumes when stretching and holding the free ends of a belt for lacing.

Fig. 2 is a plan view of one of the members.

Fig. 3 is a similar view of the other member.

Fig. 4 is a longitudinal section through the pawl carrying member and the toothed bar.

Figs. 5, 6 and 7 are detail views of various parts.

Referring to the drawings, the numeral 10 designates a bar provided with the recesses or teeth 11 and 12, upon opposite edges thereof. Fitting in the apertured end 13 thereof is an open link 14, which receives the eye 15 of the yoke 16. The free ends 17 of the yoke are bent at right angles to the body of the terminals thereof, and are threaded, so that they can be passed through the apertures of the two plates 18 and 19, the fixed nuts 20 limiting the movement of the plate 18, while the removable nuts 21 permit the plate 19 to be moved so that the free ends of the belt 22 may be inserted between the plates 18 and 19 and be clamped therebetween. The opposite end of the bar 10 is provided with the offset apertured lug 23, in which slides the rod 24.

This rod 24 carries the two hooks 25 and 26 at its ends, the planes of such hooks being at right angles to each other. Connected to the hook 25 is the loop or bail 27, which is fast to the sleeve 28, which fits slidably upon the bar 10, and is provided at one end with the flange 29. Carried by the sleeve and projecting from each side thereof in opposite directions are the fulcrum pins 30, which receive the apertures 31 of the two spaced members 32 of the operating lever 33. Carried by the members 32, one above and the other below the bar 10, are the two pawls 34, each of which is provided with the tooth engaging end 35 and the handle 36. Thus as the lever is rocked or reciprocated, the pawls alternately engage and disengage the teeth of the bar 10, and cause the rod to be moved longitudinally of the bar 10.

Mounted in the other hook 26 of the rod 24 is the eye 37 of the yoke 38, which is made similarly to the yoke 16, carrying the two clamping plates 39 and 40. Thus the two ends of the belt may be properly clamped, and with the parts in the position as shown in Fig. 1, the handle lever is operated to draw the two clamps toward each other and consequently tighten the belt and bring the free ends in position to be adjusted for lacing.

From the foregoing description it is evident that with a device of this character the free ends of the belt will be maintained in parallel, so that after the ends have been brought together and cut, if need be, they will be securely held in such position until the lacing is completed.

Where this apparatus is used upon belts of greater width than the plates of the clamping devices, openings are punched in the belt to receive the threaded shanks, such openings it having been demonstrated in practice not in anyway weakening the belt.

What I claim, as new, is:—

A belt stretcher and lacing device comprising pairs of bars having registering openings near opposite ends, substantially V-shaped members having terminals bent at right angles thereto and threaded for detachably engaging in the registering openings in said pairs of bars, nuts engaged with the threaded terminals for acting upon the bars to bring the same in clamping engagement with the ends of a belt, each member at its bight being formed with an eye, a rack bar having a guide ear at one end, a rod slidable through the guide ear and having hook terminals, one of said terminals being detachably engaged with one eye of one V-shaped member, a sleeve slidable upon the rack bar and having a bail for the detachable engagement therewith of the other hook terminal of said rod, fulcrum pins on the sleeve on opposite sides thereof, an operating lever pivotally supported on the fulcrum pins, a link connecting the eye of the other member with the end adjacent thereto of the rack bar, and pawls pivoted to the operating lever at opposite sides of the rack bar and alternately engageable therewith.

In testimony whereof I affix my signature.

PETER O. CHRISTIANSON.

Copies of this patent may be obtained for five cents each, by addressing the "Commissioner of Patents, Washington, D. C."